(12) United States Patent
Beard

(10) Patent No.: US 9,930,567 B1
(45) Date of Patent: Mar. 27, 2018

(54) THREE DIMENSIONAL SPREAD SPECTRUM REMOTE CONTROL SYSTEM

(75) Inventor: Paul Beard, Bigfork, MT (US)

(73) Assignee: HORIZON HOBBY, LLC, Champaign, IL (US)

( * ) Notice: Subject to any disclaimer, the term of this patent is extended or adjusted under 35 U.S.C. 154(b) by 711 days.

(21) Appl. No.: 13/364,917

(22) Filed: Feb. 2, 2012

Related U.S. Application Data

(60) Provisional application No. 61/439,293, filed on Feb. 3, 2011.

(51) Int. Cl.
*H04W 4/00* (2009.01)
*H04W 28/04* (2009.01)

(52) U.S. Cl.
CPC .................................. *H04W 28/04* (2013.01)

(58) Field of Classification Search
USPC .......................................... 370/329; 455/464
See application file for complete search history.

(56) References Cited

U.S. PATENT DOCUMENTS

| | | | |
|---|---|---|---|
| 5,737,038 A * | 4/1998 | Gale et al. ................ | 348/759 |
| 7,330,505 B2 * | 2/2008 | Fitton .................... | H04L 1/0061 375/229 |
| 7,352,797 B2 * | 4/2008 | Eidson ........................ | 375/146 |
| 7,391,320 B1 * | 6/2008 | Beard ....................... | A63H 30/04 340/12.5 |
| 7,664,872 B2 * | 2/2010 | Osborne ............... | H04L 65/608 370/324 |
| 7,907,055 B2 * | 3/2011 | Hardy et al. ............... | 340/572.1 |
| 7,983,674 B2 * | 7/2011 | Julian et al. .................. | 455/436 |
| 2002/0003774 A1 * | 1/2002 | Wang ................... | H04B 7/0669 370/208 |
| 2004/0125889 A1 * | 7/2004 | Cumeralto ............. | H04B 1/715 375/303 |
| 2004/0162106 A1 * | 8/2004 | Monroe ................ | H04W 88/06 455/552.1 |
| 2005/0181799 A1 * | 8/2005 | Laroia .................... | H04B 17/24 455/450 |

(Continued)

OTHER PUBLICATIONS

Brown, Colin and Vigneron, Phillip; Adaptive Use of Spectrum in Frequency Hopping Multi-Band Transmission, Dec. 2006.*

*Primary Examiner* — Mark Rinehart
*Assistant Examiner* — Peter G Solinsky
(74) *Attorney, Agent, or Firm* — Baker Botts L.L.P.

(57) ABSTRACT

A three dimensional digital spectrum modulation spread spectrum technique (DSM-X) that improves channel diversity by providing multiple bands within the available portion of the frequency spectrum increasing the number of available channels. The system also improves the channel immunity through the use of at least three dimensions of pseudo-random data encoding, which adds two levels of pseudo-random frequency allocation to the pseudo-random data encoding used in prior DSM systems. The three dimensions of pseudo-random allocation may include pseudo-random data encoding, pseudo-random frequency pattern allocation among a plurality of bands defined within the assigned frequency spectrum, and pseudo-random frequency sequencing among a plurality of channels defined within each band. Additional levels of pseudo-random encoding may be implemented in direct sequence coding for header data, repeat packet timing, and packet iteration timing.

13 Claims, 14 Drawing Sheets

(56) References Cited

U.S. PATENT DOCUMENTS

| | | | |
|---|---|---|---|
| 2006/0097848 A1* | 5/2006 | Davidson et al. | 340/10.2 |
| 2006/0114866 A1* | 6/2006 | Kim et al. | 370/338 |
| 2007/0105501 A1* | 5/2007 | Shen | H04L 1/0002 455/63.1 |
| 2007/0150928 A1* | 6/2007 | Hottinen | H04B 7/155 725/127 |
| 2007/0259635 A1* | 11/2007 | Oh | H04W 16/10 455/186.1 |
| 2007/0263702 A1* | 11/2007 | Kwon | H04L 1/1812 375/135 |
| 2007/0293218 A1* | 12/2007 | Meylan | H04W 74/0816 455/434 |
| 2008/0137689 A1* | 6/2008 | Shiizaki | H04L 47/283 370/498 |
| 2008/0285628 A1* | 11/2008 | Gizis | A63H 30/04 375/135 |
| 2009/0031419 A1* | 1/2009 | Laksono | H04N 7/163 726/21 |
| 2009/0086711 A1* | 4/2009 | Capretta | H04L 7/042 370/350 |
| 2009/0116462 A1* | 5/2009 | Powell | H04B 1/707 370/338 |
| 2009/0257388 A1* | 10/2009 | Khandekar | H04W 16/14 370/329 |
| 2010/0061395 A1* | 3/2010 | Park | H04W 74/085 370/437 |
| 2010/0080170 A1* | 4/2010 | Larmo | H04B 7/2603 370/328 |
| 2010/0182928 A1* | 7/2010 | Wu | H04L 5/0007 370/252 |
| 2010/0210169 A1* | 8/2010 | Rohr | G05D 1/0033 446/36 |
| 2012/0039423 A1* | 2/2012 | Heiman et al. | 375/341 |
| 2012/0058772 A1* | 3/2012 | Kazmi et al. | 455/450 |
| 2013/0148705 A1* | 6/2013 | Simmons et al. | 375/219 |
| 2014/0247895 A1* | 9/2014 | Shattil | 375/267 |
| 2015/0131703 A1* | 5/2015 | Balter | H04B 1/715 375/133 |

* cited by examiner

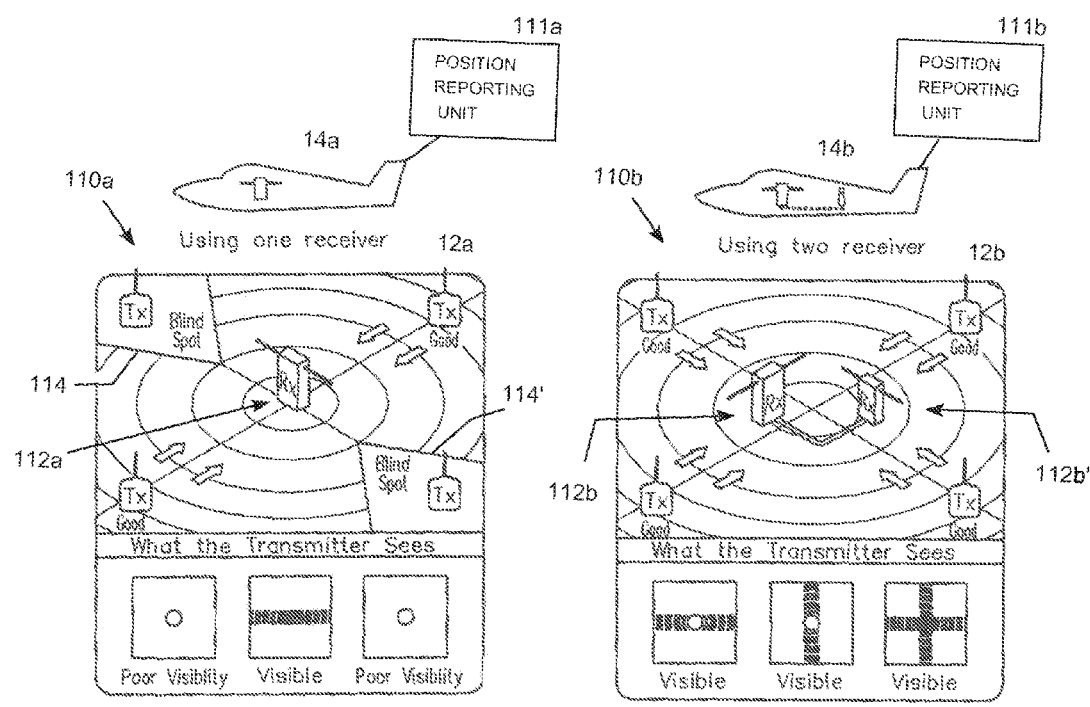
*FIG. 11A*  *FIG. 11B*

THREE DIMENSIONAL SPREAD SPECTRUM REMOTE CONTROL SYSTEM

REFERENCE TO RELATED APPLICATIONS

This application claims priority to U.S. Provisional Patent Application Ser. No. 61/439,293, filed Feb. 3, 2011, which is incorporated herein by reference.

This application relates to commonly owned U.S. Pat. No. 7,391,320 and U.S. patent application Ser. No. 12/874,133 entitled "A Radio Frequency Radio Controlled System Having Control Feedback" filed Sep. 1, 2010. U.S. Pat. No. 7,391,320 and U.S. patent application Ser. No. 12/874,133 are hereby incorporated by reference in their entirety.

FIELD OF THE INVENTION

This application relates to recreational remote controlled vehicles, such as remote controlled cars, planes and helicopters, and more particularly relates to a three dimensional spread spectrum communication system for allocating the available portion of the frequency spectrum among a large number of controlled devices.

BACKGROUND OF THE INVENTION

Recreational remote controlled vehicles, such as remote controlled cars, planes and helicopters, have become increasingly popular as the capabilities of the vehicles and control technologies have improved. It is common for a large number of enthusiasts to gather during large events for competition, camaraderie, and demonstration of new technologies. At these events, dozens of remote controlled vehicles may attempt to operate at the same time, which saturates the portion of the frequency spectrum assigned to this technology. The resulting data congestion leads to cross talk, data collisions, increased transmission latency, and a loss of control over the vehicles. While the problem could be solved by greatly increasing the width of the portion of the frequency spectrum assigned to this technology, the competition for frequency spectrum allocation restricts spectrum availability resulting in relatively narrow bands assigned to specific applications by regulation. Moreover, the occurrence of extremely crowded control requirement to accommodate dozens of vehicles is limited to infrequent large scale events. Allocating a larger portion of the available frequency spectrum to this particular application to accommodate infrequent events would therefore be an inefficient use of the available spectrum. What is needed is a way to greatly increase the efficiency of the existing spectrum allocation to accommodate larger numbers of control channels within the available portion of the frequency spectrum already made available to this application.

SUMMARY OF THE INVENTION

The present invention meets the needs described above through a digital spectrum modulation (DSM) spread spectrum technique, known as DSM-X, that implements at least three dimensions of pseudo-random encoding to improve the efficiency of the available portion of the frequency spectrum and thereby greatly increase the number of controlled devices that can use the portion of the spectrum made available to recreational remote control. Prior DSM techniques typically rely on pseudo-random spectrum spreading in a single dimension, typically the information coding dimension (e.g., GMSK) with direct sequence encoding in the frequency domain. With single dimensional DSM as the point of departure, DSM-X reaches new heights in spread spectrum technology through the use of at least three dimensions of pseudo-random data encoding. The advent of DSM-X can be thought of as single dimensional DSM extended to three or more dimensions.

The DSM-X system improves single dimensional channel diversity by subdividing the available portion of the spectrum into multiple bands and providing multiple channels within each band to increase the number of available channels over prior single band DSM systems. DSM-X also improves channel immunity through the use of at least three dimensions of pseudo-random data encoding, which adds at least two levels of pseudo-random frequency allocation to the single dimension of pseudo-random data encoding used in prior DSM systems. The end result of these innovations is a great improvement in the utilization of available portion of the frequency spectrum, which allows a much larger number of control channels to simultaneously utilize the same portion of the frequency spectrum without incurring increased communication latency, data collisions, cross talk or other types of cross channel interference.

Generally described, the present invention may be implemented as a radio control system for utilizing an assigned frequency spectrum to carry data links for a large number of radio controlled devices. The DSM-X system includes a number of radio controlled devices and a number of controllers, each controlling at least one of the radio controlled devices. Typically, the controller may be a single or dual device controller. The single device controller, in which each controller has a single associated radio controlled device, will be described for convenience. The controller transmits control signals to its associated radio controlled device via a radio frequency data link. The controller encodes device control data in its associated data link through spread spectrum data encoding utilizing at least three dimensions of pseudo-random encoding.

The three dimensions of pseudo-random encoding typically include pseudo-random data encoding (e.g., pseudo-random frequency sequence encoding for the packet header, pseudo-random GMSK data encoding for the packet payload data, or both), pseudo-random frequency pattern allocation among a plurality of bands defined within the assigned frequency spectrum, and pseudo-random frequency sequencing among a plurality of channels defined within each band. For a specific implementation utilizing these frequency allocation dimensions, the frequency pattern allocation may include at least three frequency bands (e.g., frequency A, B and C) defined within the assigned frequency spectrum, and the frequency sequencing allocation may include at least 23 frequency channels defined within each band (e.g., frequency channels A1-A23, B1-B23, and C1-C23). In addition to pseudo-random data encoding, DSM-X may also implement pseudo-random frequency channel allocation in both the frequency pattern selection (i.e., among the frequency bands) and in the frequency sequence selection (i.e., among the frequency channels).

The controller may also transmit the data encoded in the data link in the form of data packets with pseudo-random repeat time spacing between repeat packets containing duplicate data, and pseudo-random increment time spacing between packet iterations containing different data. That is, the controller may transmit each data packet redundantly including at least an initial packet and a repeated packet, while randomly controlling the repeat timing between packets containing the same data and the iteration timing between packets containing different data. Each data packet typically includes a header containing synchronization information allowing the associated radio controlled device to follow the encoding and timing scheme implemented by the controller. The header is followed by a data payload containing encoded device control signals, and one or more forward error check parameters. There are several spread spectrum encoding schemes that may be used for code modulation. In general, the header and the payload may each be encoded with frequency shift key or phase shift key encoding (e.g., GMSK). In addition, either of these shift key encoding protocols, or both, may use predetermined or pseudo-randomly determined encoding patterns. Typically, the header may be encoded through direct sequence (DS) modulation or through modified DS modulation using pseudo-random sequencing, while the data payload is typically encoded through GMSK phase shift key modulation. However, the header may alternatively be encoded with phase shift key modulation and the payload may alternatively be encoded with frequency shift key modulation, with direct or pseudo-random encoding, as desired.

In view of the foregoing, it will be appreciated that the present invention significantly improves upon prior spread spectrum communication techniques for radio controlled devices. Specific structures and processes for implementing the invention, and thereby accomplishing the advantages described above, will become apparent from the following detailed description of the illustrative embodiments of the invention and the appended drawings and claims.

BRIEF DESCRIPTION OF THE DRAWINGS

FIGS. 11A-B are conceptual illustrations showing improved geometrical reception achieved by including dual antennas on a radio controlled device in the DSM-X system.

DETAILED DESCRIPTION OF THE PREFERRED EMBODIMENTS

Figure 1:
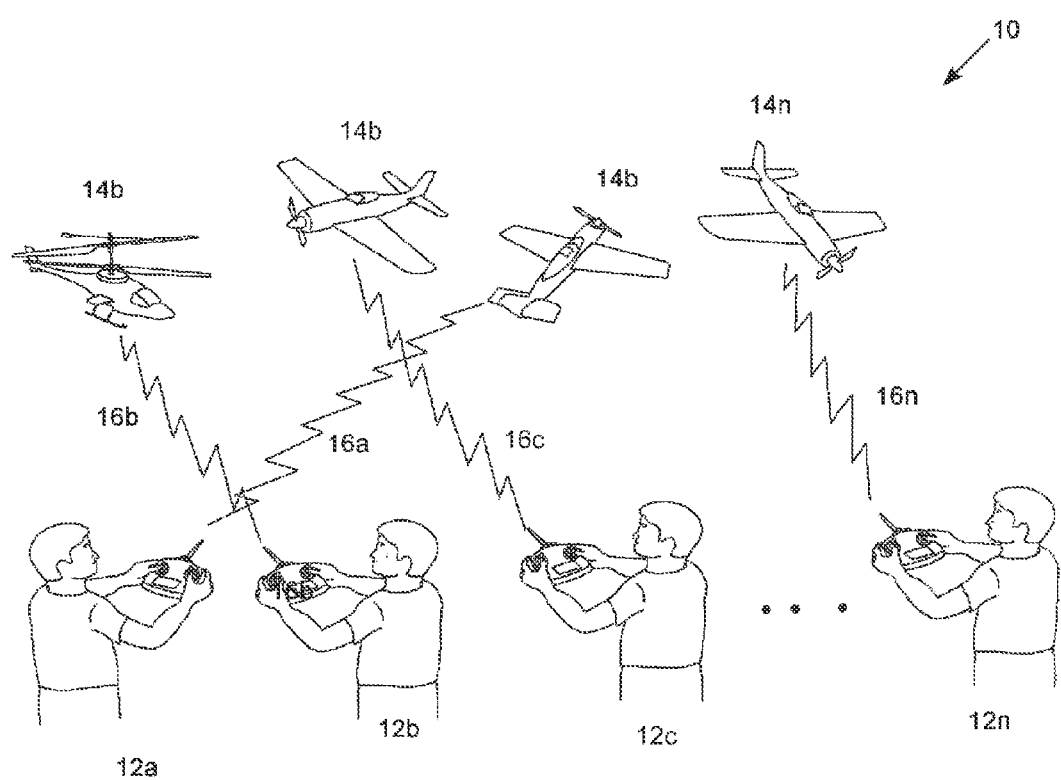
FIG. 1 is an illustration of a typical recreational aircraft application of DSM-X technology.

The present invention may be embodied in a DSM-X recreational radio controlled vehicle system, such as the miniature aircraft system shown in FIG. 1. Of course, DSM-X technology may be applied to other types of miniature radio controlled vehicle systems, such as radio controlled airplanes, cars, boats, and so forth. Similarly, DSM-X technology may be applied to other non-recreational radio control systems, such as unmanned aerial vehicle and aerial weapon systems. More generally, many other multi-device communication, monitoring and control systems may also benefit from DSM-X technology, such as vehicle monitoring systems, premises access monitoring systems, livestock monitoring systems, child and pet monitoring system, irrigation control systems, industrial machinery monitoring and control systems, cargo monitoring systems, and a wide range of other radio control and monitoring applications that can benefit from improvements in frequency spectrum diversity and immunity.

DSM-X can be thought of as single dimensional DSM extended to three dimensions. Single dimensional DSM typically utilizes pseudo-random data encoding, such as frequency shift key or GMSK phase shift key encoding. The additional spread spectrum encoding dimensions implemented by DSM-X include pseudo-random frequency pattern allocation and pseudo-random frequency spectrum allocation. Pseudo-random frequency pattern allocation is accomplished by dividing the available portion of the frequency spectrum into multiple bands, such as three bands A, B and C, and randomly hopping among the bands. Pseudo-random frequency sequence allocation further develops this concept by dividing each frequency band into multiple channels, such as 23 channels per band, and randomly hopping among the channels. The resulting pseudo-random frequency allocation randomly hops not only among the channels in each band, but also among the bands, which significantly increases the spread spectrum utilization of the available portion of the spectrum. For example, prior systems typically accommodate a fixed number of simultaneous control channels through direct sequence allocation among the available control channels. DSM-X increases the number of available control channels by first dividing the available spectrum into three bands, usually of an equal number of control channels, to increase the spectrum diversity. In a specific example, where prior one dimensional spread spectrum techniques divided the available spectrum into 23 control channels, DSM-X divides the same spectrum into three bands (e.g., A, B, C) of 23 channels each (e.g., A1-A23, B1-B23, and C1-C23).

DSM-X further improves the spectrum utilization by pseudo-randomly assigning a frequency pattern among the bands and, in addition, pseudo-randomly assigning a frequency sequence among the channels within each band, to greatly improve control channel immunity, which may be thought of as improving control channel isolation or avoiding crosstalk and data packet collisions. The result is a very significant increase in the spread spectrum utilization and an associated increase in the number of simultaneous control channels available within the available spectrum. In the particular example shown in the figures and described below, where prior one dimensional spread spectrum technology provided 23 simultaneous control channels, DSM-X provides well over 100 simultaneous control channels.

Turning to the drawings, in which like numerals refer to similar elements, FIG. 1 is an illustration of a typical operating environment for the DSM-X system 10, in this example a recreational miniature aircraft application. Operators use remote controllers 12a-n to operate radio controlled miniature aircraft 14a-n via radio frequency data links 16a-n. In a large event, dozens of operators would like to be able to utilize the same control channels dedicated to this particular application. Prior single dimensional spread spectrum DSM communication systems can accommodate about two dozen aircraft simultaneously. The improved three dimensional spread spectrum DSM-X communication system can accommodate 100 or more aircraft simultaneously.

Figure 2:
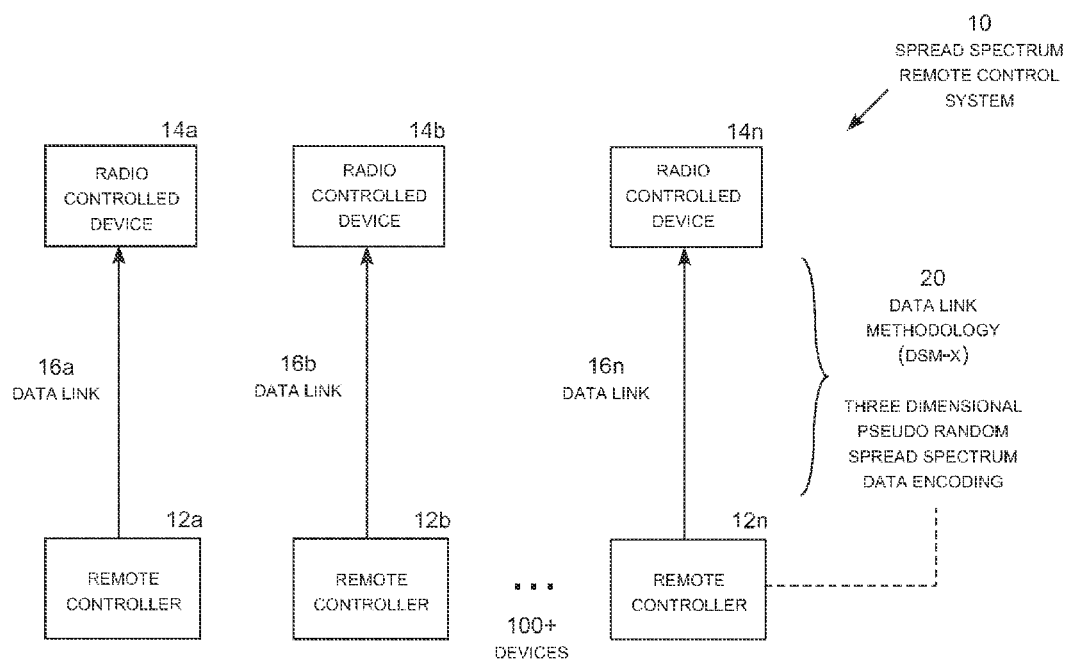
FIG. 2 is a conceptual block diagram illustrating the implementation of DSM-X technology for radio controlled devices generally.

FIG. 2 is a conceptual block diagram illustrating a generalized implementation of the DSM-X system 10 including remote controllers 12a-n operating radio controlled devices 14a-n via radio frequency data links 16a-n. In this more generalized example, the radio controlled system can be used for any type of a wide variety of specific applications ranging from miniature radio controlled vehicles (cars, planes, helicopters, boats), unmanned aerial vehicles, aircraft carrier vehicles, remote airstrip vehicles, military ordinance, vehicle tracking systems, premises access control, vehicle tracking, person and animal tracking, and industrial monitoring, to name but a few. While many of these applications are already in use with less effective spread spectrum communication systems, the salient feature of the present invention is the spectrum technology 20 employed by DSM-X using at least three dimensions of pseudo-random encoding to improving the spread spectrum utilization and thereby increase the number of simultaneous control channels that can be operated within the available portion of the frequency spectrum.

Figure 3:
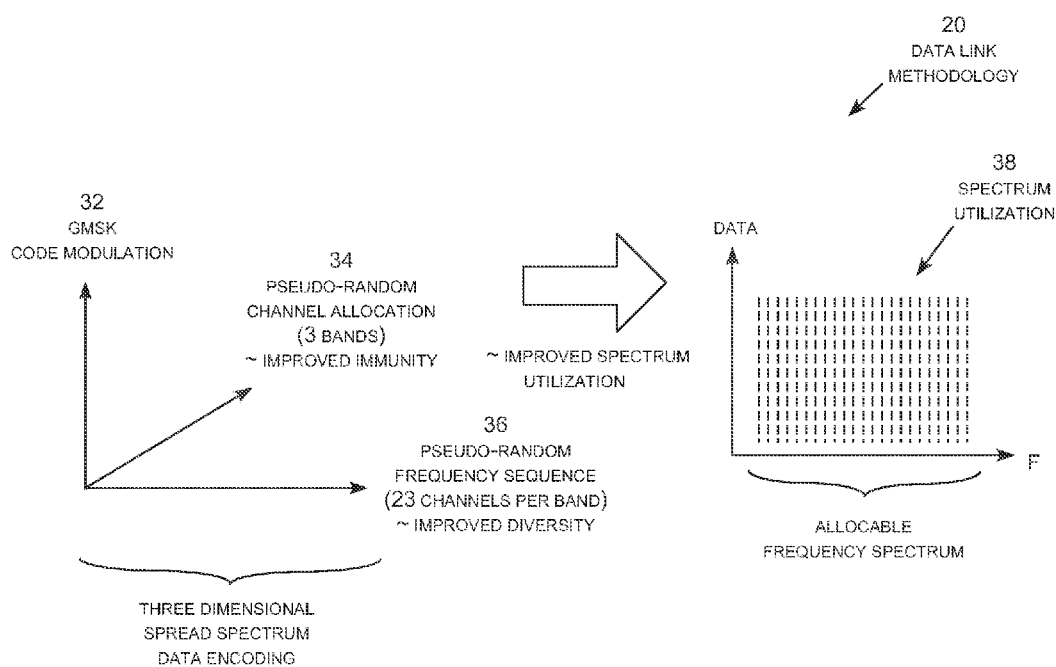
FIG. 3 is a conceptual illustration of three dimensional spread spectrum data encoding resulting in improved spectrum utilization.

FIG. 3 is a conceptual illustration of the three dimensional spread spectrum technology 20 employed by DSM-X. The three dimensions of pseudo-random data encoding include the code modulation dimension 32, the pseudo-random frequency pattern 34 applied among three frequency bands (A, B, C) defined within the available portion of the frequency spectrum, and the pseudo-random frequency sequence 36 applied among 23 frequency channels defined within each of the frequency bands (A, B, C), resulting in 69 available channels (A1-A23, B1-23, and C1-23). Increasing the number of channels from 23 to 69 within three bands improves channel diversity three fold. Adding pseudo-random frequency pattern selection among the bands, along with pseudo-random frequency sequencing within each band, greatly increases the channel immunity. In other words, employing three dimensions of pseudo random data encoding greatly improves the spread spectrum utilization 38, which results in improved channel isolation through a reduction in the occurrence of crosstalk and data packet collisions, resulting in an increase in the number of simultaneous control channels that can be operated within the available portion of the frequency spectrum.

Figure 4:
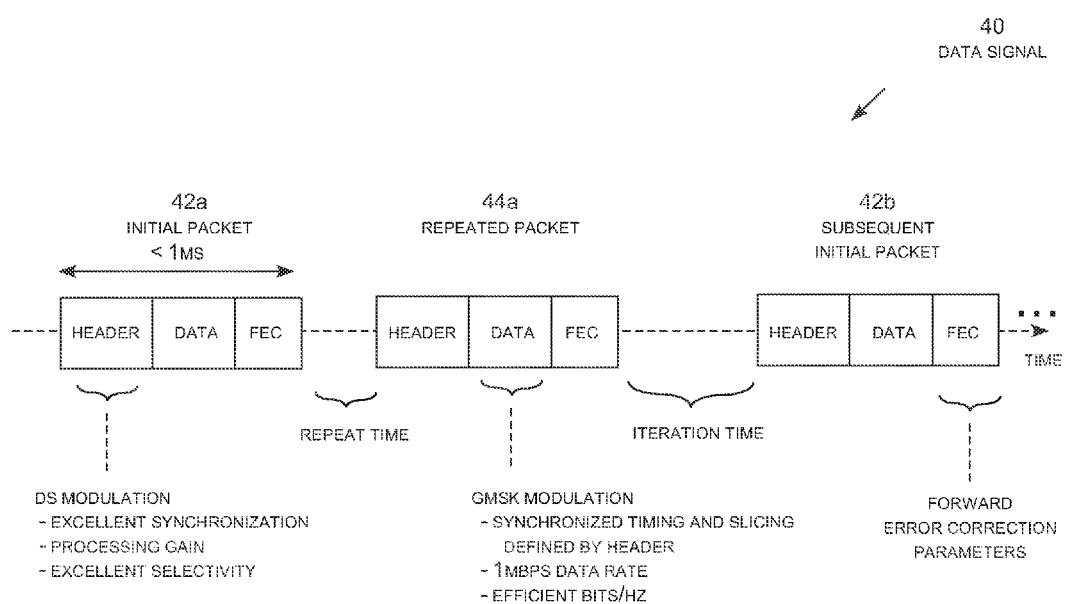
FIG. 4 is a data signal diagram illustrating the packet structure of the data links implemented by the DSM-X system.

FIG. 4 is data signal diagram illustrating the transmission packet structure of the data signal 40 encoded within the data links 16a-n implemented by the DSM-X system 10. The data signal 40 is formed from a series of data packets including initial packets 42a-n and repeated packets 44a-n. Each initial data packet contains different payload data, whereas each repeat pack contains a repeat of the payload in the immediately preceding packet (i.e., the payload in initial packet 42a is repeated in repeat packet 44a, and the second initial packet 42b contains new payload data, which is repeated in repeat packet 44b, etc.) Each packet is typically less than one (1) microsecond resulting in a data saturation of only 6% for each data link. The repeat and iteration times may be pseudo-randomly selected to minimize the occurrence of data packet overlap between packets in different data links.

The packet header contains synchronization data that allows the controller and radio controlled device to maintain communication and follow the time and frequency division encoding scheme implemented by the controller. The synchronization data includes at least an address associated with the data link established at the time of "sync" or handshake associating a particular controller with an associated radio controlled device, the frequency channel assigned to the that particular packet, and the forward time slice for the forward packet. While the packet timing parameter for the current packet is received in the immediately preceding packet, the frequency channel assignment for the current packet may be received in the immediately preceding packet or in the current packet. The radio controlled device uses the header information to identify packets addressed to that particular device, the frequency channel to tune to the correct channel to receive the data payload, and the forward time slice to properly receive the next packet in the data link. The header is typically encoded with direct sequence frequency modulation, which provides for excellent synchronization, processing gain and selectivity. The modulation sequence may also be pseudo-randomly assigned to provide another level of pseudo-random encoding in the data link.

The packet header is followed by the payload data, which contains the encoded control signals for the radio controlled device. The payload data typically includes the operational control signals for the radio controlled device generated by user operation of manual instruments on the remote controller, such as joysticks, triggers, buttons, knobs, and so forth. The control signals operate the accelerator, steering, and other functionality of the radio controlled device. The payload data is pseudo-randomly encrypted and encoded into the data signal through frequency or phase shift key modulation, such as GMSK encoding. The packet ends with one or more forward error check parameters.

Figure 5:
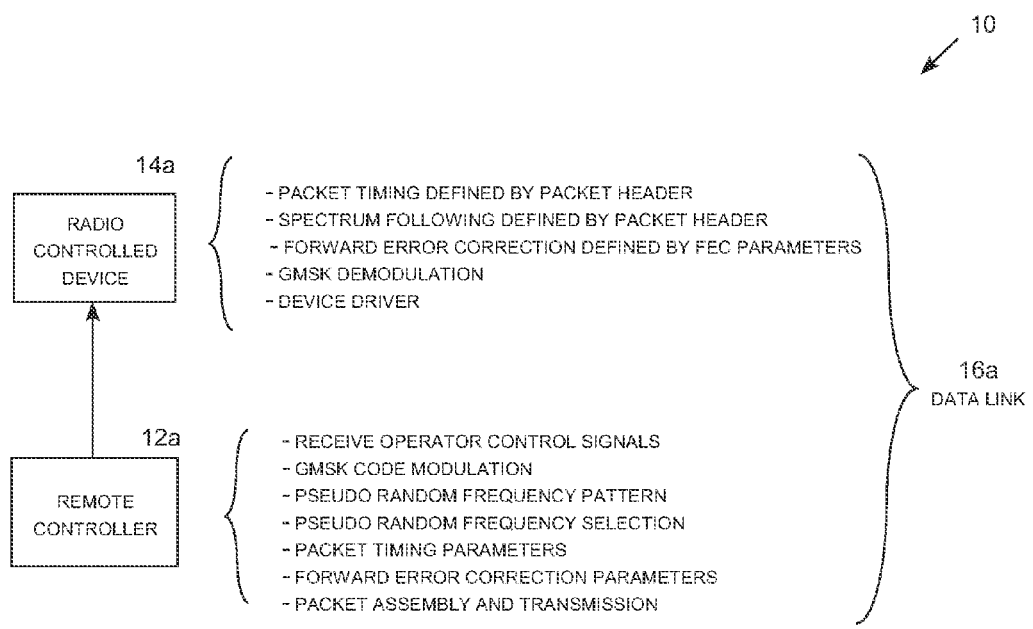
FIG. 5 is a functional block diagram illustrating the functionality of the radio controlled devices and remote controllers in the DSM-X system.

FIG. 5 is a functional block diagram illustrating the functionality of the radio controlled devices and the remote controllers in the DSM-X system 10. One illustrative remote controller 14a and one illustrative radio controlled device 12a are described for convenience. The controller 14a receives control signals from the operator through the manual control devices on the remote controller. The controller encodes, packetizes and transmits the control signals to the radio controlled device 16a. In a specific example, the controller encodes the data with three dimensions of data encoding including pseudo-random GSMK encoding, pseudo-random frequency pattern encoding within three frequency bands (bands A, B, C), and pseudo-random frequency sequence encoding within 23 channels within each band (channels A1-A23, B1-B23, and C1-C23). The controller creates the data signal by organizing the data into packets containing a packet header encoded with direct sequence frequency modulation, payload data encoded with GMSK encoding, and one or more forward error check parameters. The packets are time division spaced with pseudo-random repeat times and pseudo-random iteration times to create a data signal that modulates the carrier frequency to create the data link.

The radio controlled device 12a receives each data packet at the correct time interval using timing information received in the prior packet. The radio controlled device then demodulates the data link, error checks the packet using the error check parameter contained in the packet, and reads the packet header. The radio controlled device also obtains the correct frequency channel for reading the payload data, which reflects the pseudo-random frequency pattern and pseudo-random frequency sequence assigned by the controller. The specific frequency channel for the payload may be identified in the previous packet header or in the current packet header. The radio controlled device tunes to the correct frequency channel, receives the payload data, GMSK demodulates the payload data, obtains the control data, and operates the device drivers to maneuver the device.

Figure 6:
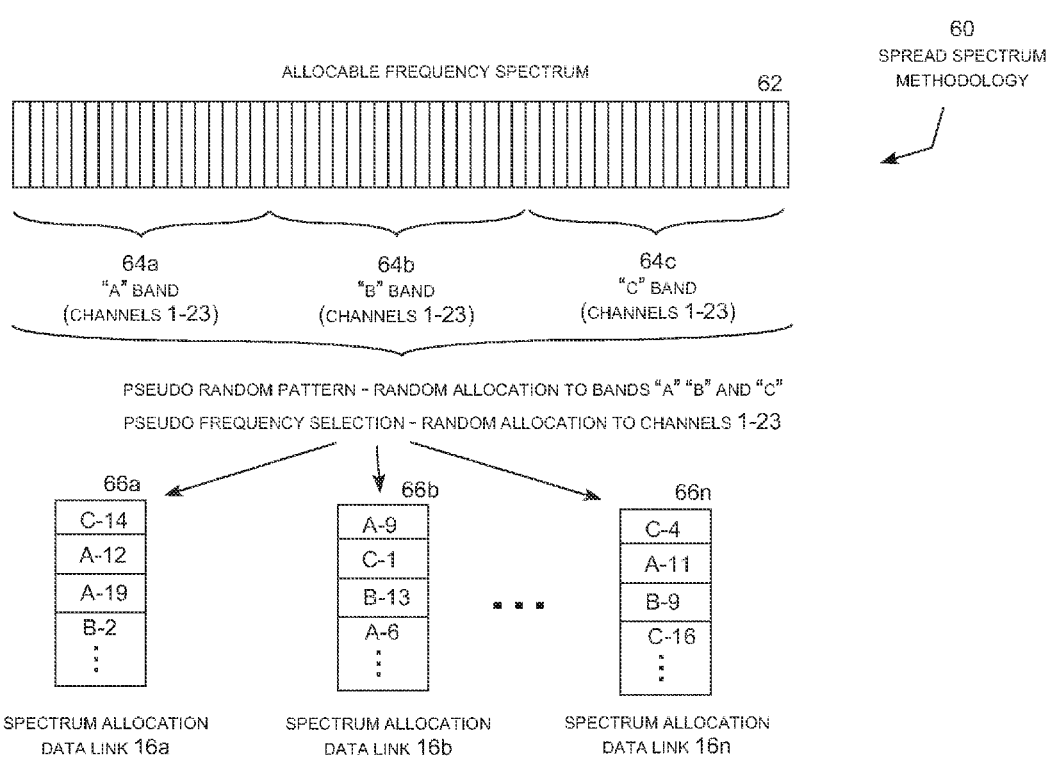
FIG. 6 is a conceptual illustration of frequency allocation in the DSM-X system.

FIG. 6 is a conceptual illustration of the frequency allocation methodology 60 in the DSM-X system. The available portion of the spectrum 62 is divided into three bands, "A" band 64*a*, "B" band 64*b*, and "C" band 64*c*. Each band is further divided into 23 channels, resulting in channels A1-A23, B1-B23 and C1-C23. For each data link, the controller assigns a pseudo-random frequency pattern among the bands A-C and a pseudo-random frequency sequence among the 23 channels of the selected band each. The resulting channel allocation is stored in a frequency table 66*a* for the data link 16*a* reflecting the two-level pseudo-random channel assignment for the data link 16*a*. Similarly, a second frequency table 66*b* stores the channel allocation for the second data link 16*b*, and so forth. Within each data link, the device control signals in the packet payload are pseudo-randomly encoded with GMSK encoding representing the third dimension of data encoding. The direct sequence frequency allocations used to modulate the header may also be pseudo-randomly allocated to provide another level of pseudo-random encoding. In addition, the packet repeat and iteration timing may be pseudo-randomly spaced in the time domain to provide yet another level of pseudo-random encoding.

Figure 7:
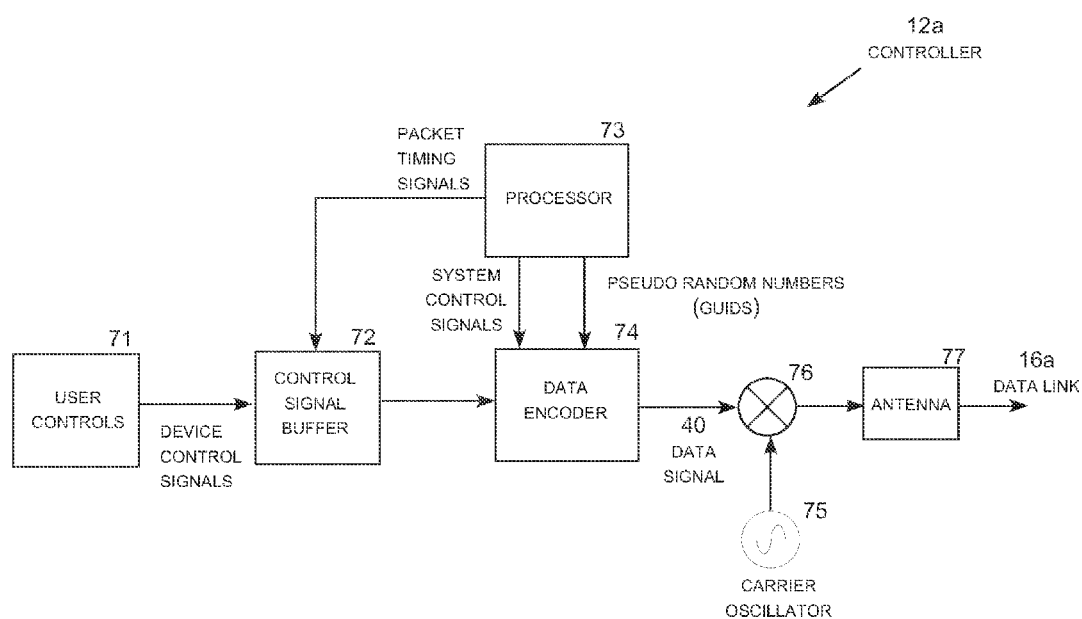
FIG. 7 is a functional block diagram of a remote controller in the DSM-X system.

FIG. 7 is a functional block diagram for an illustrative remote controller 12*a* in the DSM-X system. The operator manipulates the user controls 71, such as joysticks, wheels, triggers, etc., to produce device control signals for operating the associated radio controlled device via the data link 16*a*. The device control signals are temporarily cached in a control signal buffer 72. A processor 73 controls the operation of the remote controller 12*a*, which includes the definition of packet timing signals used to control the release of device control signals from the control signal buffer 72 to the data encoder 74. The processor also produces pseudo-random numbers, such as globally unique identifiers (GUIDs), that are used by the data encoder to encode the data signal, packetize the information, and implement frequency channel allocation. More specifically, the data encoder 74 assembles the data signal using the device control signals from the control signal buffer 72 along with system control signals and the GUIDs from the processor 73, which are used for data encoding, packet spacing, frequency pattern allocation, and frequency sequence allocation. The data encoder 74 uses this information to encode the payload data, which is sent to a mixer 76 that modulates a carrier signal 75 with the data signal to create the data link 16*a*. The data link 16 is then transmitted by the antenna 77 for reception by the associated radio controlled device.

Figure 8:
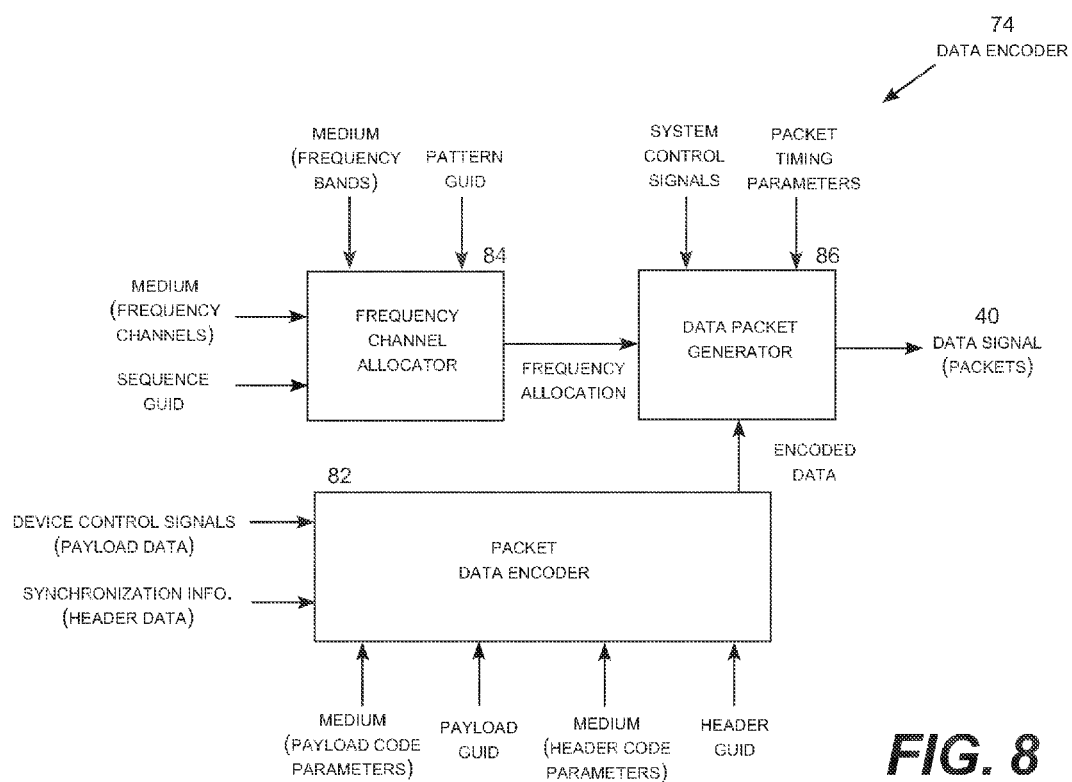
FIG. 8 is a functional block diagram of a data encoder in the remote controller in the DSM-X system.

FIG. 8 is a functional block diagram showing the data encoder 74 in greater detail. The packet data encoder 82 receives synchronization information from the processor 73 for encoding the header portion of the packet. The packet data encoder 82 may also receive a header GUID and the medium definition for the header including the available code parameters, typically a set of frequencies available for header encoding, from the processor. The frequency sequence may be directly assigned if a header GUID is not provided or, if a header GUID is provided, the encoder pseudo-randomly assigns the frequency sequence. The packet data encoder 82 stores the header coding data in a code table for timed release to the data packet generator 86.

The packet data encoder 82 also receives the device control signals from the control signal buffer 72 and coding parameters from the processor 73, such as GMSK phase shift or frequency shift parameters, for encoding the payload portion of the packet. The packet data encoder 82 may also receive a payload GUID from the processor. The code sequence may be directly assigned if a payload GUID is not provided or, if a payload GUID is provided, the encoder pseudo-randomly assigned the code sequence. The packet data encoder 82 stores the payload coding data in the code table for timed release to the data packet generator 86.

The frequency channel allocator 84 receives the frequency band definitions, may receive a pattern GUID from the processor 73, and implements pseudo-random frequency band pattern allocation. The frequency band pattern may be directly assigned if a pattern GUID is not provided or, if a pattern GUID is provided, the encoder pseudo-randomly assigned the band pattern. The frequency channel allocator 84 also receives frequency channel definitions, may receive a frequency sequence GUID from the processor 73, and implements pseudo-random frequency sequence allocation. The resulting frequency channel assignments are stored in a frequency allocation table for timed release to the data packet generator 86.

The data packet generator 86 receives the encoded data from the packet data encoder 82 and the frequency sequence allocation from the frequency channel allocator 84 under timing provided by the processor 73. The data packet generator 86 also receives system control signals and packet timing data from the processor 73 and uses this information to create the data signal 40 reflecting three dimensions of pseudo-random, spread spectrum data encoding along with pseudo-random packet repeat and iteration timing. The data signal 40 is then used to modulate the carrier signals to form the data link emitted by the antenna.

Figure 9:
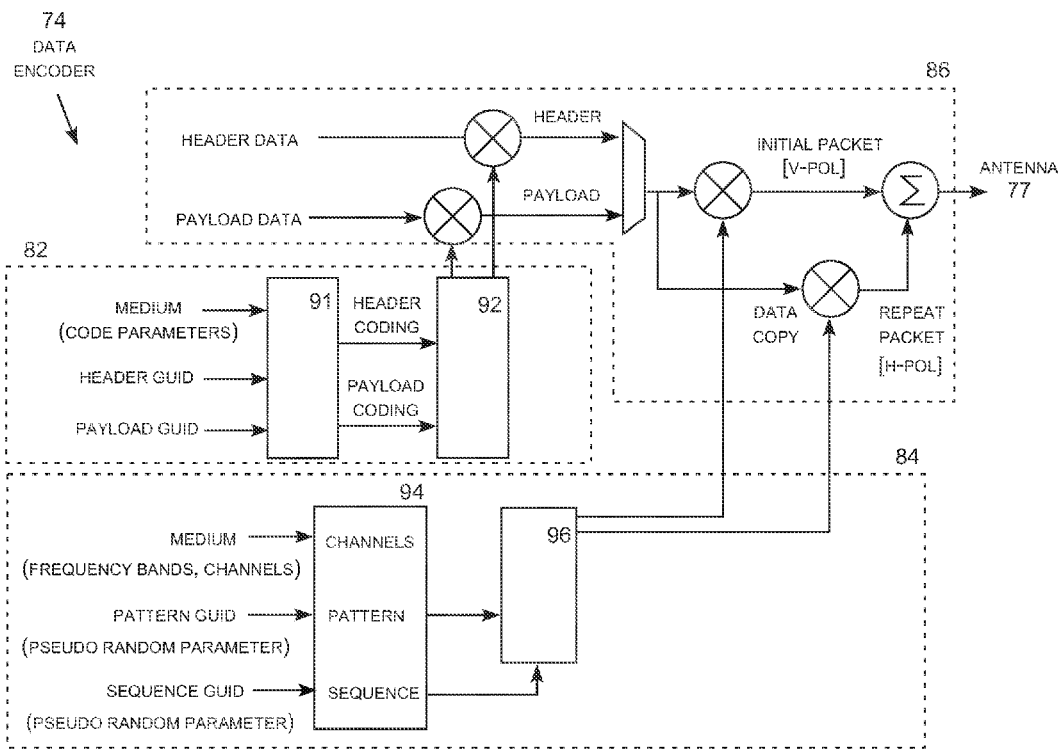
FIG. 9 is a more detailed functional block diagram of the data encoder in the remote controller in the DSM-X system.

FIG. 9 is a more detailed functional block diagram of the data encoder 74 showing additional functional blocks forming the packet data encoder 82, the frequency channel allocator 84, and the data packet generator 86. The packet data encoder 82 includes a coding kernel 91 that receives the coding medium (e.g., GMSK coding phase shift or frequency shift parameters and frequencies available for data encoding), the header GUID and the payload GUID from the controller 73. The packet data encoder 82 generates the encoding data for the packets and stores this data in the code table 92, where it is available for timed release to the data packet generator 86. In alternative embodiments, the data packet generator may utilize either the header GUID, or the payload GUID, or both GUIDs to incorporate pseudo-random encoding in the packet data.

The frequency channel allocator 84 includes a frequency selection kernel 94 that receives the allocation medium (e.g., frequency band and channel definitions), the pattern GUID, and the sequence GUID from the processor 73. The frequency channel allocator 84 generates the frequency allocation for the packets and stores this data in the frequency allocation table 96, where it is available for timed release to the data packet generator 86. In alternative embodiments, the frequency channel allocator may utilize either the pattern GUID, or the sequence GUID, or both GUIDs to incorporate pseudo-random encoding in the packet frequency allocation.

The data packet generator 86 mixes the synchronization information (header data) with the header coding data from the code table 92 in accordance with packet timing control from the processor 73 to encode the packet header. Similarly, the data packet generator 86 mixes the device control signals (payload data) with the payload coding data from the code table 92 in accordance with packet timing control from the processor 73 to encode the packet payload. The data packet generator 86 adds one or more error correction parameters to complete the initial packet, which is copied to create a repeat packet. The initial packet and the repeat packet modulate the carrier frequency in accordance with the frequency allocation information from the frequency allocation table 96. The initial and repeat packets are combined in accordance with repeat timing controlled by the processor and transmitted via the antenna 77. The process is then repeated with iteration timing controlled by the processor and the next initial, repeat packet pair is transmitted by the antenna 77. As an option, the initial packet may be transmitted on a first antenna polarization (e.g., vertical polarization) and the repeat packet may be transmitted on a second antenna polarization (e.g., horizontal polarization) using orthogonal dual polarization antenna radiators.

Figure 10:
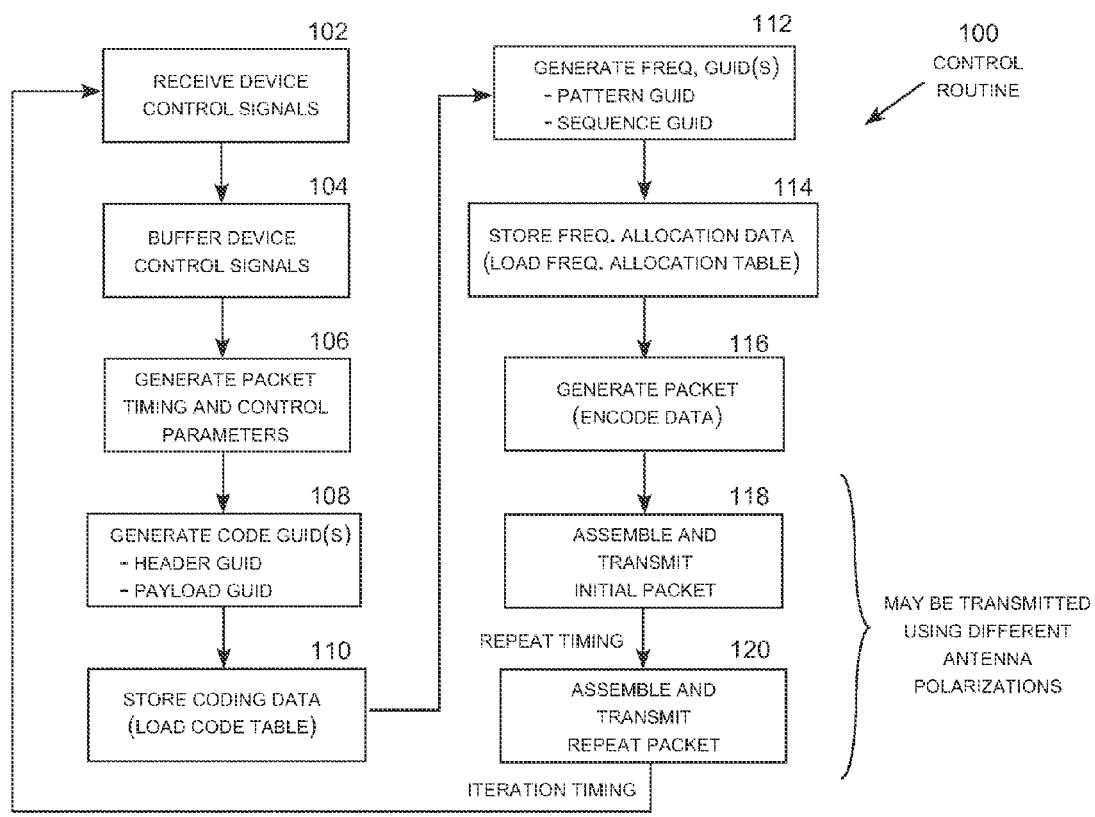
FIG. 10 is a logic flow diagram for the operation of the remote controller in the DSM-X system.

FIG. 10 is a logic flow diagram of the control routine 100 implemented by the remote controller in the DSM-X system. In step 102, the remote controller receives device control signals representing user manipulation of the manual controls on the remote controller, such as joysticks, triggers, knobs, etc. Step 102 is followed by step 104, in which the remote controller buffers the device control signals for timed release for creation of the packetized data signal under the control of the processor. Step 104 is followed by step 106, in which the remote controller generates packet timing and control parameters for the current packet including synchronization information, error check parameters, repeat and iteration timing parameters. Either the repeat or iteration timing parameter, or both, may be pseudo-randomly assigned by the processor. Step 106 is followed by step 108, in which the remote controller generates one or more code GUIDs. For example, a first header GUID may be used to pseudo-randomly encode the header data with frequency sequence encoding; and a second payload GUID may be used to pseudo-randomly encode the payload data, for example with GMSK phase or frequency shift key encoding. Step 108 is followed by step 110, in which the coding data is stored in a code table for timed release in packet generation.

Step 110 is followed by step 112, in which the remote controller generates one or more frequency allocation GUIDs. For example, a first frequency pattern GUID may be generated for pseudo-randomly assigning a pattern of frequency bands, and a second sequence GUID may be generated for pseudo-randomly assigning channel sequences within the frequency bands. Step 112 is followed by step 114, in which the remote controller loads a frequency table with the channel allocations created with pseudo-random frequency pattern and sequence allocation.

Step 114 is followed by step 116, in which the remote controller encodes the packet data as it generates the packet including the header, payload and error check parameters. The processor times the release of data from the control signal buffer, the code table and the frequency tables to encode the data and generate the packet at the proper time intervals. Step 116 is followed by step 118, in which initial packet is generated and transmitted by the antenna. Step 118 is followed by step 120, in which a repeat packet is generated and transmitted by the antenna. This completes the process for a first iteration of packet data. Routine 100 then repeats under iteration timing controlled by the processor for the next iteration of packet data, and so on.

The DSM-X system also includes a number of other useful features improving prior radio control systems. FIGS. 11A-B are conceptual illustrations showing improved geometrical reception achieved by including dual antennas on a radio controlled device. FIG. 11A shows an illustrative remote controller 12a used to operate an illustrative aircraft 14a with a single receiver. The remote controller 12a (labeled "transmitter" in the figure) includes a display 110a that shows the operator a view of the operating environment from the perspective of the aircraft 14a. To enable this functionality, the aircraft 14a includes a position reporting unit 111a that reports the vehicle position and other parameters, such as orientation, velocity, acceleration, fuel level, and other status information to the remote controller 12a. This requires a duplex data link between the aircraft and remote controller. The position reporting unit 111a includes flight information gathering equipment, typically including a GPS receiver for ascertaining the absolute position of the aircraft, a gyroscope for ascertaining the orientation of the aircraft, a polling circuit for ascertaining status information about the vehicle (e.g., fuel level, voltage, engine temperature, wind speed, etc.), a processor for computing values based on the measured parameters (e.g., velocity, acceleration, remaining flight time, distance from controller, etc.), a transmitter for sending the flight information to the remote controller 12a for display on the controller, a memory for storing the flight information, and a data port for downloading the flight information from the aircraft after the flight. The data port allows the flight information to be downloaded in a batch mode for analysis, flight simulation, storage, and transmission to other locations.

The orientation of the aircraft 14a is fixed relative to the display 110a, which results in the position of the remote controller 12a moving around on the display as the aircraft changes its position and orientation with respect to the transmitter. In this example, the aircraft 14a includes a single directional receive antenna 112a oriented parallel to the fuselage of the aircraft (i.e., aligned with the direction of travel of the aircraft). Due to its directionality, the antenna receives signals well from the transmitter when the aircraft is oriented broadside to the transmitter, but receives signals poorly when the aircraft is oriented in line with the transmitter. This results in blind spots 114 and 114' shown on the display 110a when the aircraft is oriented substantially in line with the transmitter.

FIG. 11B shows a similar arrangement with a remote controller 12b having a display 110b operating a radio controlled miniature aircraft 14b with a position reporting unit 111b, except that this aircraft includes two receive antennas 112b and 112b' oriented perpendicular to each other (i.e., one antenna aligned with the direction of travel of the aircraft and the other antenna oriented perpendicular to the direction of travel of the aircraft). This provides good reception both broadside and in line with the fuselage. As a result, there are no blind spots shown on the display 110b.

Figure 12A:
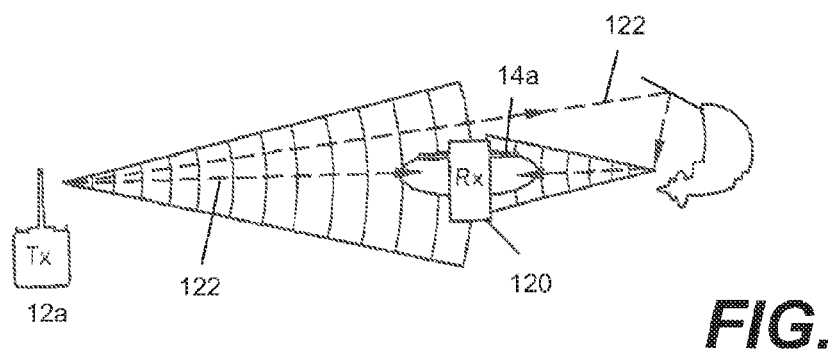
FIGS. 12A-B are conceptual illustrations showing improved geometrical reception achieved by the DSM-X system through reception of reflected signals 180 degrees out of phase.
Figure 12B:
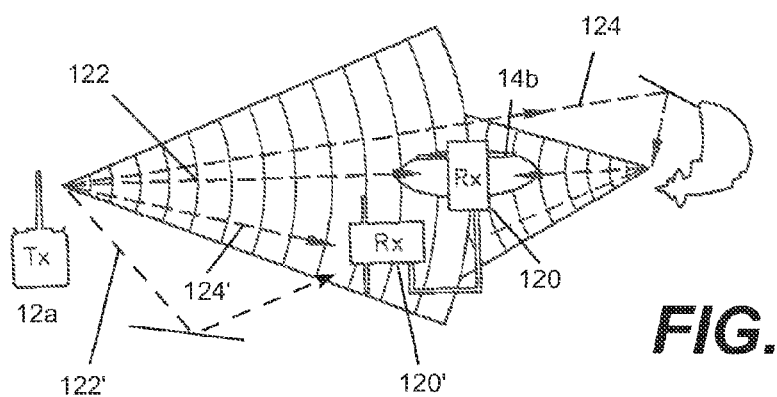

FIGS. 12A-B are conceptual illustrations showing improved geometrical reception achieved by the DSM-X system through reception of reflected signals 180 degrees out of phase. FIG. 12A shows an illustrative remote controller 12a used to operate an illustrative aircraft 14a having a single receive antenna 120. The DSM-X system allows the aircraft to receive the data link in a direct path 122 and in a reflected path 124 that arrives at the receiver 120, 180 degrees out of phase with the direct path. This improves the continuity of communication for the data link by providing the potential for signal reception through a reflected path even when the direct line of sight is blocked or in an antenna blind spot. FIG. 12B illustrates the extension of this functionality to an aircraft 14b with two perpendicular receive antennas 120 and 120'. In this example the data link has four paths for reaching the aircraft, the first direct path 122 and the first reflected path 124 to the first antenna 120, and a second direct path 122' and a second reflected path 124' to the second antenna 120'. This further improves the continuity of communication for the data link.

Figure 13A:
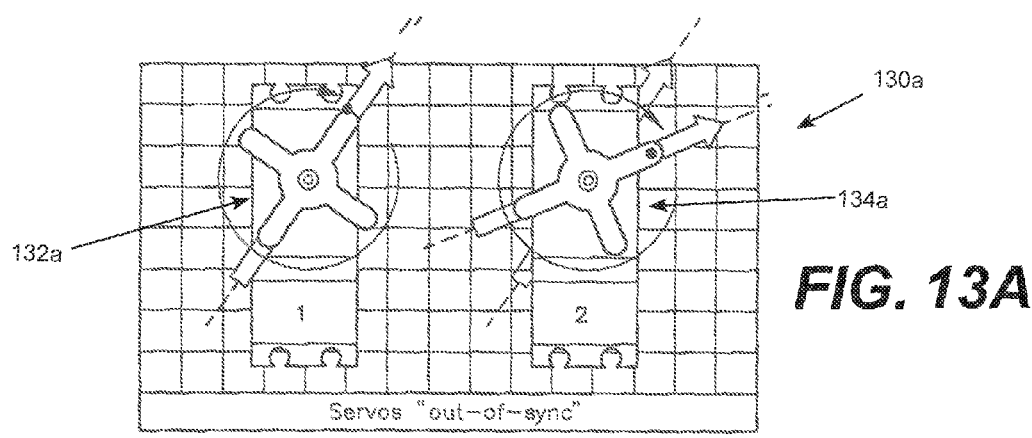
FIGS. 13A-B are conceptual illustrations showing a dual device DSM-X remote controller with synchronized operation functionality.
Figure 13B:
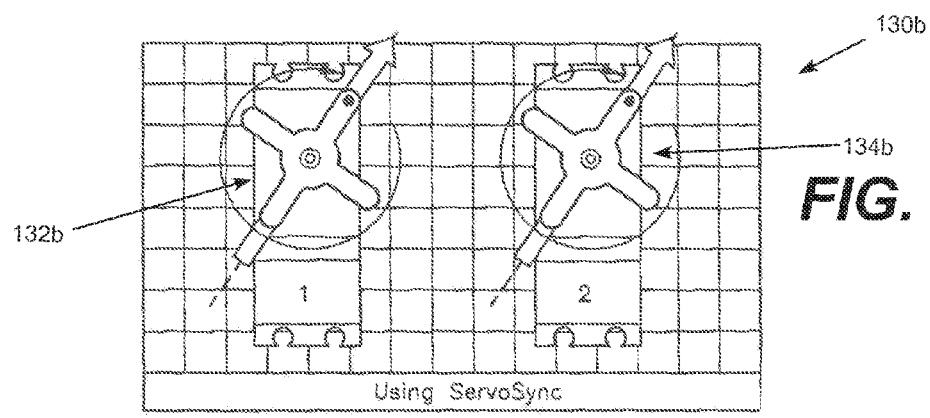

FIGS. 13A-B are conceptual illustrations showing a dual device DSM-X remote controller with synchronized operation functionality. This type of controller is described in greater detail in commonly owned U.S. Pat. No. 7,391,320, which is incorporated by reference. Additional related technology is described in U.S. patent application Ser. No. 12/874,133 entitled "A Radio Frequency Radio Controlled System Having Control Feedback" filed Sep. 1, 2010, which is also incorporated by reference. FIG. 13A shows a dual device DSM-X remote controller 130a with two joysticks 132a and 134a for operating two different radio controlled devices. In this example, the joysticks operate independently so that each aircraft can have independent flight paths. FIG. 13B illustrates a similar dual device remote controller 130b with a "ServoSync" feature activated, which synchronizes the joysticks 132b and 134b with each other. This allows the aircraft to receive synchronized device control signals, which is useful for flying the aircraft in formation. The "ServoSync" feature can be easily turned on and off, typically with an easily reached toggle switch.

Figure 14:
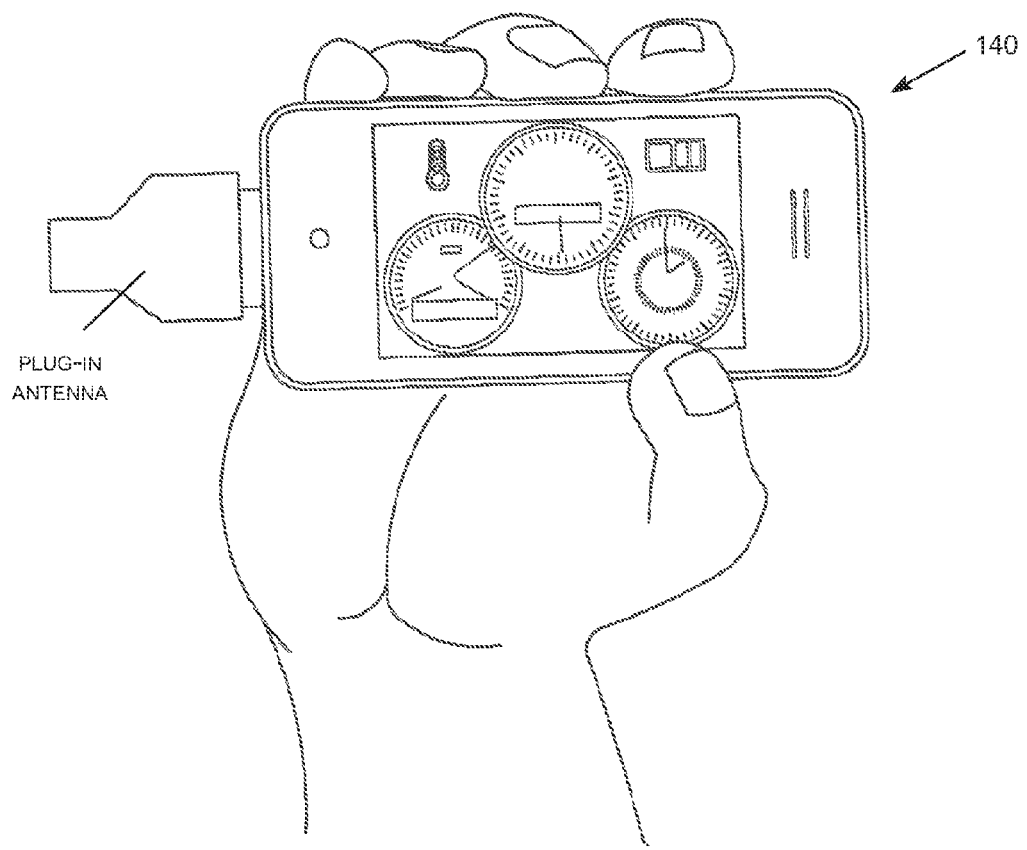
FIG. 14 is a conceptual illustration of a reduced size DSM-X remote controller.

FIG. 14 is a conceptual illustration of a reduced size DSM-X app-enabled remote controller 140, which may be implemented on a smart device, such as a smartphone using a downloaded app and a plug-in antenna, which turns any smart device with a touch screen into a remote controller usable with the DSM-X system. The app can also be used to turn an iPod, PDA, laptop computer, or any other suitable computing device into a DSM-X remote controller. In addition, peripheral control devices, such as plug-in or wireless joysticks and game controllers, can be integrated with the app-enabled device to provide additional device control functionality. Two app-enabled remote controllers can also be synchronized with each other to implement the "ServoSync" functionality described with reference to FIGS. 13A-B. The app-enabled remote controller can also be used to download flight data from the aircraft for analysis, flight simulation, storage and transmission to another location, such as a server based flight analysis and simulation system, via the Internet.

In view of the foregoing, it will be appreciated that present invention provides significant improvements in spread spectrum remote control of radio controlled devices and that numerous changes may be made therein without departing from the spirit and scope of the invention as defined by the following claims.

What is claimed is:

1. A spread spectrum controller configured to transmit data over a data link within an assigned frequency spectrum, the spread spectrum controller comprising:
   a data packet encoder configured to encode the data for transmission over the data link;
   wherein the data packet encoder receives synchronization data and a header globally unique identifier and encodes a header packet portion of a packet based, at least in part, on the received synchronization data and the header globally unique identifier;
   wherein the header globally unique identifier is a pseudo-random parameter;
   wherein the data packet encoder receives a control signal, at least one coding parameter, and a pattern globally unique identifier and encodes a payload packet portion based, at least in part, on the received control signal, the at least one coding parameter, and the pattern globally unique identifier;
   wherein the pattern globally unique identifier is a pseudo-random parameter;
   wherein the data packet encoder stores at least the header packet portion and the payload packet portion in a code table for timed release to the data packet generator;
   a frequency channel allocator configured to: (i) use a pattern globally unique identifier to band hop the data link among a sequence of frequency bands within the assigned frequency spectrum; and (ii) use a sequence globally unique identifier to channel hop the data link among a sequence of frequency channels within the sequence of frequency bands;
   wherein the frequency channel allocator receives frequency band definitions, frequency channel definitions, the pattern globally unique identifier, and the sequence globally unique identifier;
   wherein the pattern globally unique identifier and the sequence globally unique identifier are pseudo-random parameters;
   wherein the sequence of frequency channels are based, at least in part, on the received frequency band definitions, frequency channel definitions, the pattern globally unique identifier, and the sequence globally unique identifier and are stored in a frequency allocation table for timed release to the data packet generator;
   a data packet generator configured to assemble packets containing the encoded data;
   wherein the encoded data includes at least the encoded header packet portion and the encoded payload packet portion received from the data packet encoder and the sequence of frequency channels received from the frequency channel allocator; and
   an antenna configured to transmit the assembled data packets over the data link via the combination of frequency bands and channels according to the band hop and channel hop sequences implemented by the frequency channel allocator.

2. The spread spectrum controller of claim 1, wherein the data encoder is configured to use frequency shift keying (FSK) or phase shift keying (PSK) modulation to encode data.

3. The spread spectrum controller of claim 1, wherein the set of frequency bands comprises at least three frequency bands.

4. The spread spectrum controller of claim 1, wherein the set of frequency channels comprises at least 23 frequency channels within each frequency band of the set of frequency bands.

5. The spread spectrum controller of claim 1, wherein an individual packet includes a header, a data payload containing the encoded data, and at least one forward error checking parameter.

6. The spread spectrum controller of claim 5, wherein the data packet header is modulated according to direct sequence spread spectrum modulation.

7. The spread spectrum controller of claim 1, wherein the spread spectrum controller is configured to pseudo-randomly vary time between transmitting a first data packet and a second data packet containing different data than the first data packet.

8. The spread spectrum controller of claim 1, wherein the spread spectrum controller is configured to pseudo-randomly vary time between transmitting a first data packet and a copy of the first data packet.

9. A system comprising:
a controller configured to transmit control data for controlling a radio-controlled (RC) vehicle, wherein the controller comprises:
one or more processors configured to:
encode the control data for transmission over a data link;
receive synchronization data and the header globally unique identifier and encodes a header packet portion of a packet based, at least in part, on the received synchronization data and the header globally unique identifier;
wherein the header globally unique identifier is a pseudo-random parameter;
wherein the one or more processors receive a control signal, at least one coding parameter, and a pattern globally unique identifier and encode a payload packet portion based, at least in part, on the received control signal, the at least one coding parameter, and the pattern globally unique identifier;
wherein the pattern globally unique identifier is a pseudo-random parameter;
wherein the data packet encoder stores at least the header packet portion and the payload packet portion in a code table for timed release to the data packet generator;
schedule transmission of the control data according to a two-level frequency hopping spread spectrum (FHSS) sequence that comprises (a) hopping among a plurality of frequency bands according to a pattern globally unique identifier and (b) hopping among a plurality of channels within each frequency band according to a sequence globally unique identifier;
wherein the one or more processors receive frequency band definitions, frequency channel definitions, the pattern globally unique identifier, and the sequence globally unique identifier;
wherein the pattern globally unique identifier and the sequence globally unique identifier are pseudo-random parameters;
wherein the hopping among a plurality of channels is based, at least in part, on the received frequency band definitions, frequency channel definitions, the pattern globally unique identifier, and the sequence globally unique identifier and the one or more processors store the plurality of channels in a frequency allocation table;
assemble packets containing the encoded data;
wherein the encoded data includes at least the encoded header packet portion and the encoded payload packet portion received from the data packet encoder and the plurality of channels; and
one or more antennas configured to transmit the modulated control data according to the two-level FHSS sequence scheduled by the one or more processors.

10. The system of claim 9, wherein transmitting the spread spectrum modulated control data according to the two-level FHSS sequence comprises: (i) transmitting a first packet comprising first control data at a first time, (ii) transmitting a copy of the first packet comprising the first control data at a second time, wherein the time between the first time and the second time is based on a second pseudo-random code, (iii) transmitting a third packet comprising second control data at a third time, wherein the time between the second time and the third time is based on a third pseudo-random code.

11. The system of claim 9, further comprising:
a remote controlled vehicle comprising:
one or more receivers configured to receive and demodulate the spread spectrum modulated control data according to the two-level FHSS sequence transmitted by the controller; and
a reporting unit configured to transmit vehicle operational parameters to the controller.

12. The system of claim 9, wherein the one or more processors are further configured to generate packets comprising the control data, wherein generating an individual packet comprises: (i) creating a header for the packet, the header comprising (i-a) an address for the packet, (i-b) an indication of an assigned channel and frequency band for the packet, and (i-c) an indication of when the controller will transmit a subsequent packet;
wherein the one or more processors is further configured to spread spectrum modulate the header according to a second pseudo-random code; and
wherein the one or more antennas are further configured to transmit the spread spectrum modulated header and spread spectrum modulated control data according to the two-level FHSS sequence scheduled by the one or more processors.

13. The system of claim 12, further comprising:
a remote controlled vehicle comprising:
one or more receivers configured to receive and decode the individual packet, wherein decoding the individual packet comprises (i) spread spectrum decoding the header according to the second pseudo-random code and (ii) spread spectrum decoding the payload portion according to the first pseudo-random code.

* * * * *